(12) United States Patent
Kwiatkowski et al.

(10) Patent No.: US 8,042,513 B2
(45) Date of Patent: Oct. 25, 2011

(54) INTERNAL COMBUSTION ENGINE CAMSHAFT SCHEDULING STRATEGY FOR MAXIMUM PUMPING LOSS REDUCTION

(75) Inventors: Adam S. Kwiatkowski, Commerce, MI (US); Prabjot Nanua, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 629 days.

(21) Appl. No.: 12/188,483

(22) Filed: Aug. 8, 2008

(65) Prior Publication Data
US 2010/0036582 A1 Feb. 11, 2010

(51) Int. Cl.
*F02D 41/00* (2006.01)
(52) U.S. Cl. ........................ 123/321; 123/90.17; 701/103
(58) Field of Classification Search .................. 123/321, 123/90.15–90.17, 361, 399; 701/101, 102, 701/115
See application file for complete search history.

(56) References Cited

U.S. PATENT DOCUMENTS

| | | | | |
|---|---|---|---|---|
| 5,143,030 A | * | 9/1992 | Ikeura | 123/90.16 |
| 5,152,267 A | * | 10/1992 | Komatsu et al. | 123/90.16 |
| 5,168,851 A | * | 12/1992 | Itoyama et al. | 123/399 |
| 5,347,962 A | * | 9/1994 | Nakamura et al. | 123/90.17 |
| 5,495,830 A | | 3/1996 | Wu | |
| 6,581,564 B2 | * | 6/2003 | Ogawa et al. | 123/295 |
| 6,843,214 B1 | | 1/2005 | Herrin | |

* cited by examiner

*Primary Examiner* — Hieu T Vo
(74) *Attorney, Agent, or Firm* — Quinn Law Group, PLLC

(57) ABSTRACT

A method of camshaft scheduling is disclosed which includes measuring a driver input; calculating a driver requested torque based on a measured driver input; and scheduling the camshaft based upon the driver requested torque. In one example, the driver input is an accelerator pedal position, which is related to a percentage of driver torque requested. The cam position is selected based on the driver requested torque and the cam position is adjusted to provide one of a best fuel economy cam position and a best torque output cam position based upon the percentage of driver torque requested.

13 Claims, 3 Drawing Sheets

INTERNAL COMBUSTION ENGINE CAMSHAFT SCHEDULING STRATEGY FOR MAXIMUM PUMPING LOSS REDUCTION

TECHNICAL FIELD

This invention relates generally to internal combustion engines and, more particularly, to an internal combustion engine camshaft scheduling strategy that provides increased fuel economy by reducing pumping loss.

BACKGROUND OF THE INVENTION

In an effort to improve fuel economy, internal combustion engines incorporate camshaft scheduling strategies, which regulate camshaft timing based primarily on engine speed (RPM) and engine load, where the engine load is determined based on airflow, e.g. trapped air per cylinder (APC), relative load (displacement scaled APC) or other measure of volumetric efficiency.

One known technique of controlling engine load is Late Intake Valve Closing (LIVC). In LIVC, intake throttling is replaced with intake back-flow, i.e. gases are returned back to the intake manifold until the required charge is obtained inside the cylinder, effectively reducing pumping losses within the system.

However, because known camshaft scheduling strategies utilize APC based tables and further because LIVC, in the high-mid load region of the engine operating range, causes a disproportionately large change in manifold absolute pressure (MAP) with respect to a relatively small change in APC, these known camshaft scheduling strategies limit the application of LIVC to the low load region of the engine operating range.

Therefore, while these known camshaft scheduling strategies are useful to improve fuel economy, such improvement is limited to the low load region of the engine operating range and results in sub-optimal fuel efficiency in the high-mid load operating range.

SUMMARY OF THE INVENTION

A method of camshaft scheduling is disclosed which includes measuring a driver input; calculating a driver requested torque based on the measured driver input; and scheduling a camshaft based upon the driver requested torque.

In one example embodiment, the driver input is an accelerator pedal position, which is related to a percentage of driver torque requested. A cam position is selected based on the driver requested torque and the cam position is adjusted to provide one of a best fuel economy cam position and a best torque output cam position based upon the percentage of driver torque requested.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
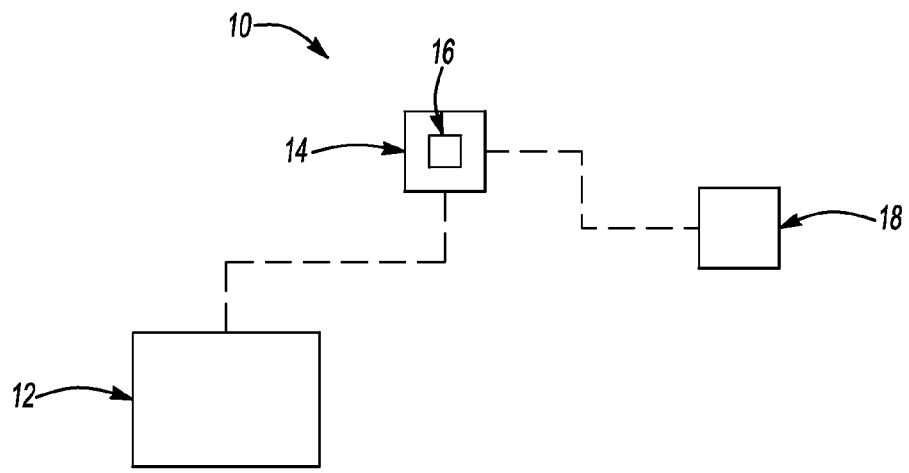
FIG. 1 is a schematic illustration of an internal combustion engine system including a camshaft scheduling strategy according to one embodiment of the present invention.

Referring to the drawings, wherein like reference numbers refer to like components, FIG. 1 is a schematic illustration of an internal combustion engine system 10 according to on embodiment of the present invention. The internal combustion engine system 10 includes an internal combustion engine 12 and an engine control module 14 in communication with the internal combustion engine 12. The engine control module 14 includes a memory 16 that is operable to store a camshaft scheduling strategy.

As discussed below in further detail, the camshaft scheduling strategy is operable to selectively control the rotation of a camshaft, which in turn regulates the opening and closing of intake and exhaust valves.

The engine control module 14 is operable to receive a driver input 18 and selectively rotate the camshaft and/or adjust the throttle according to the camshaft scheduling strategy and based upon the driver input 18.

Figure 2:
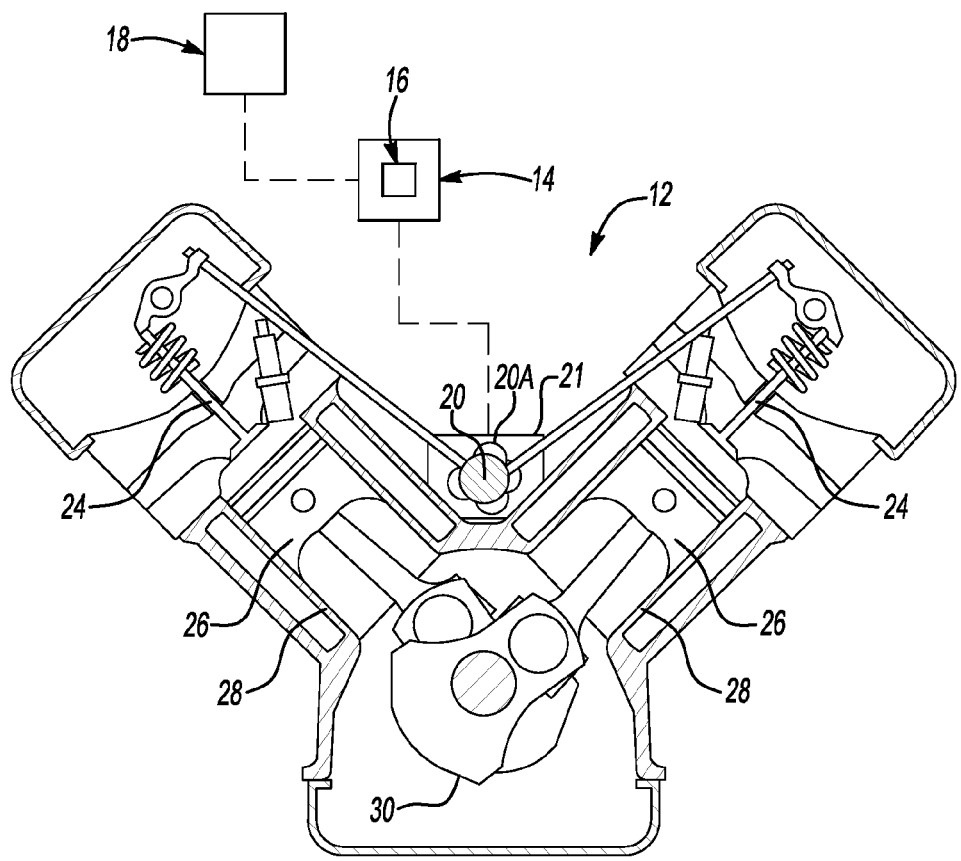
FIG. 2 is a detailed illustration of the internal combustion engine of FIG. 1.

As illustrated in FIG. 2, the internal combustion engine 12 includes at least one camshaft 20 disposed in rotatable communication with the internal combustion engine 12. A cam phasing actuator or phaser 21 is in operable communication with the engine control module 14 and, based on the camshaft scheduling strategy, the phaser 21 schedules each camshaft 20 accordingly.

Each camshaft 20 includes a plurality of lobes 20A. As the camshaft 20 rotates, the plurality of lobes 20A are operable to open and close intake and exhaust valves 24 in time with the motion of pistons 26, which move within cylinder bores 28 based on the rotation of a crankshaft 30.

Just as one of the pistons 26 starts to move downward in an intake stroke from top dead center (TDC), the intake valve associated with that piston 26 would open allowing an air/fuel mixture to accelerate into the cylinder bore 28 associated with that piston. The intake valve then closes just as the piston 26 reaches the bottom of the cylinder bore 28, i.e., near the bottom of the intake stroke.

The piston 26 then moves upward in a compression stroke compressing the air/fuel mixture, which is ignited, just as the piston 26 reaches the top of the cylinder bore 28, i.e., near the end of the compression stroke. The fuel/air mixture is ignited, for example, by a spark plug (not shown) in a gasoline engine or by the heat and pressure associated with combustion in a diesel engine, creating pressure within the cylinder bore 28. The pressure then pushes the piston 26 back downward in a power stroke.

Subsequently, the exhaust valve associated with that piston 26 opens just as the piston 26 reaches the bottom, i.e. bottom dead center (BDC) of the cylinder bore 28 at the end of the power stroke. The piston 26 then moves upward to push the products of combustion or exhaust out from the cylinder bore 28 through the exhaust valve associated with that piston 26 and the cycle repeats.

The timing of these valve events is controlled by a cam profile, i.e. the geometry of the cam lobes 20A and the camshaft scheduling strategy, which is operative to selectively rotate the camshaft 20 to delay the opening and/or closing of the intake and/or the exhaust valves 24.

The camshaft scheduling strategy is stored within the memory 16 of the engine control module 14. The engine control module 14 receives the driver input 18; selects a cam position based upon the driver requested torque and schedules the camshaft 20 based upon the cam position selected.

Figure 3:
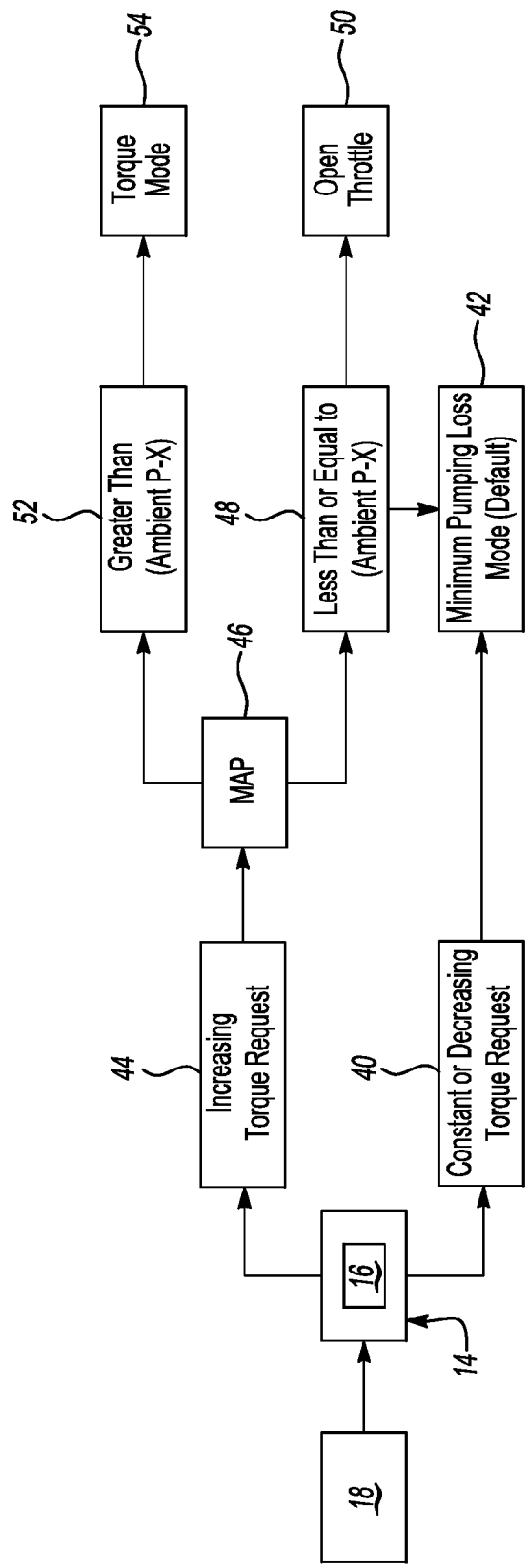
FIG. 3 is a flowchart illustrating a camshaft scheduling strategy according to one embodiment of the present invention.

As illustrated in FIG. 3, according to one example embodiment of the present invention, when the driver input 18 is indicative of a constant or decreasing torque request 40, the engine control module 14 schedules the camshaft 20 based upon a first or default camshaft scheduling strategy 42, which, in the illustrated example, is a Minimum Pumping Loss Mode.

In the Minimum Pumping Loss Mode, the electronic control module 14 incorporates Late Intake Valve Closing (LIVC), retarding the intake valve closing event, reducing cylinder trapping, thereby reducing the effective compression ratio and allowing closer to Minimum Advance for Best Torque (MBT) spark advance. As such, in the Minimum Pumping Loss Mode, pumping losses within the internal combustion engine 12 are minimized resulting in improved fuel efficiency.

When the driver input 18 is indicative of an increasing torque request 44, i.e. a higher percentage of driver requested torque, and a manifold absolute pressure (MAP) 46 is less than ambient pressure P less a predetermined value X, as illustrated in Box 48, the engine control module 14 is operable to maintain the default camshaft scheduling strategy 42 while opening a throttle 50 for increased performance.

However, when the driver input 18 is an increasing torque request and the manifold absolute pressure (MAP) 46 is greater than the ambient pressure P less the predetermined value X, as illustrated in Box 52, then the engine control module 14 is operable to schedule the camshaft 20 based upon a second cam scheduling strategy 54, which, in the illustrated example, is a Torque Mode.

In the Torque Mode, the electronic control module 14 commands an intake cam advance, in which the intake valve closing time is advanced to take advantage of the intake air inertia, i.e., the speed at which it enters the combustion chamber, increasing the incoming air velocity. This increased velocity creates a "supercharge" effect on the incoming air. As such, in the Torque Mode, the torque output of the internal combustion engine 12 is maximized, resulting in increased vehicle performance and responsiveness.

In the illustrated example embodiment, the driver input 18 is an accelerator pedal position, which is related to a percentage of driver torque requested. As a driver steps into an accelerator pedal, the accelerator pedal position changes from a zero position to a maximum position (i.e. total accelerator pedal travel). Also, in the illustrated example embodiment, the predetermined value X is based on but not limited to engine RPM and/or a barometric pressure.

Figure 4:
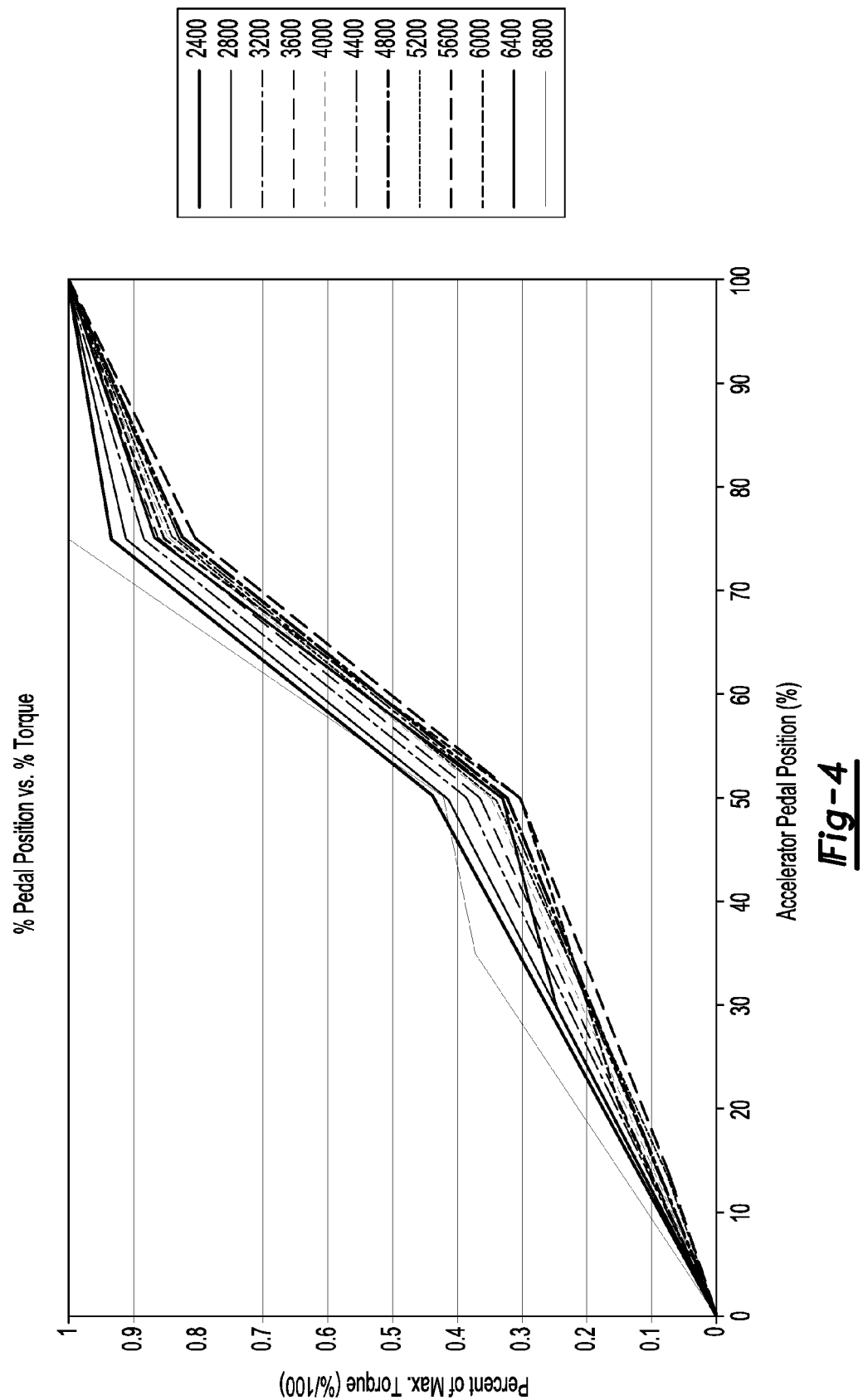
FIG. 4 is an example graphical representation of a driver input for use in a camshaft scheduling strategy according to one embodiment of the present invention.

The engine control module 14 is operable to determine a percentage of the total accelerator pedal travel, based upon the accelerator pedal position, and relate the percentage of total accelerator pedal travel to a percentage of maximum torque, i.e. percentage of driver torque requested, based on engine RPMs, as illustrated in FIG. 4.

When the percentage of driver requested torque is calculated based on the accelerator pedal position and the percentage of driver requested torque is the input for the camshaft scheduling strategy, the intake valve can be fully retarded right up to the point of zero engine vacuum, significantly reducing pumping work losses associated with manifold vacuum.

Further, since Brake-Specific-Fuel-Consumption (BSFC) steady state gains of 1% to 4% result in a high-mid load operating region and the high-mid load operating region is the speed-load region frequented more often as vehicle mass increases or as engine displacement decreases, and is also affected by aggressive "fuel economy" transmission calibrations which upshift earlier than traditional strategies, the camshaft and throttle scheduling strategy allows for effective compression ratio management in knock-limited engine operating regimes. That is, at low engine speeds and high relative engine loads or high ambient temperatures, the internal combustion engine is knock-limited on recommended fuel. As such, optimal spark advance for best torque cannot be achieved without audible engine knock occurring.

As discussed above, by retarding the intake valve closing event, cylinder trapping can be reduced, thereby reducing the effective compression ratio and allowing closer to MBT.

Fuel economy benefits of effective compression ratio management are two fold: first, the internal combustion engine is less knock-limited, which allows utilization of higher geometric compression rations to boost light load fuel economy; and, second, the advancement of spark timing lowers catalytic converter temperatures, which allows delay of fueling enrichment protection.

As such, according to an example camshaft scheduling strategy of the present invention, when the percentage of driver torque requested exceeds a threshold value, the engine control module 14 adjusts the cam position to provide a best torque output camshaft position as dictated by the camshaft scheduling strategy. Conversely, when the percentage of driver torque requested is below the threshold value, the engine control module 14 adjusts the cam position to provide a best fuel economy cam position, also as dictated by the camshaft scheduling strategy.

Further, because the example camshaft strategy of the present invention adjusts the cam position dynamically based upon a driver input as opposed to static APC tables, as is currently known, LIVC can be incorporated through a greater percentage of the engine operating range providing improved fuel efficiency in the high-mid load range.

While the best modes for carrying out the invention have been described in detail, those familiar with the art to which this invention relates will recognize various alternative designs and embodiments for practicing the invention within the scope of the appended claims. For example, while the internal combustion engine 12 is illustrated as a push-rod engine including a single camshaft 20 in FIG. 2, it should be appreciated that the internal combustion engine 12 is not limited to a push-rod engine but instead could also be a single overhead cam (SOHC) engine, a dual overhead cam (DOHC) engine or the like as is known.

Further, in the illustrated example embodiment, the camshaft scheduling strategy is applied only to the intake camshaft. However, the illustrated camshaft scheduling strategy is not limited to scheduling of the intake camshaft alone as the illustrated strategy can be applied to the exhaust camshaft where independent control of the exhaust camshaft from the intake camshaft is possible.

The invention claimed is:

1. A vehicle powertrain system comprising:
   an internal combustion engine including at least one camshaft with a continuously variable single cam profile;
   an engine control module in communication with the internal combustion engine, the engine control module being configured to receive a driver input and to calculate a driver requested torque based upon the driver input;
   wherein the engine control module is configured to select a cam position for the single cam profile based upon the driver requested torque; and wherein the engine control module is configured to schedule the camshaft based upon the cam position selected.

2. The vehicle powertrain system as recited in claim 1, wherein the driver input is an accelerator pedal position.

3. The vehicle powertrain system as recited in claim 2, wherein the accelerator pedal position is related to a percentage of driver torque requested.

4. The vehicle powertrain system as recited in claim 1, wherein the cam position is adjusted to provide one of a best fuel economy cam position and a best torque output cam position based upon the percentage of driver torque requested.

5. A method of camshaft scheduling for a continuously variable single cam profile, the method comprising:
   calculating a driver requested torque based upon a driver input;
   selecting a cam position for the single cam profile based upon the driver requested torque; and
   scheduling the camshaft based upon the cam position selected.

6. The method of camshaft scheduling as recited in claim 5, wherein the driver input is an accelerator pedal position.

7. The method of camshaft scheduling as recited in claim 6, wherein the accelerator pedal position is related to a percentage of driver torque requested.

8. The method of claim 7, wherein the percentage of driver torque requested is 35% for an accelerator pedal position of 50% at an engine speed of 3600 rpm.

9. The method of claim 7, wherein the percentage of driver torque requested is 35% for an accelerator pedal position of 50% at an engine speed of 3600 rpm.

10. The method of camshaft scheduling as recited in claim 5, wherein the cam position is adjusted to provide one of a best fuel economy cam position and a best torque output cam position based upon the percentage of driver torque requested.

11. The method of camshaft scheduling as recited in claim 10, wherein the cam position is constant during a first percentage range of driver requested torque.

12. The method of camshaft scheduling as recited in claim 10, wherein the cam position is advanced during a second percentage range of driver requested torque.

13. A method of camshaft scheduling for a continuously variable single cam profile, the method comprising:
   calculating a driver requested torque based upon a driver input, wherein the driver input is one of a constant torque request, a decreasing torque request and an increasing torque request;
   selecting a cam position for the single cam profile based upon the driver requested torque;
   scheduling the camshaft based upon the cam position selected;
   retarding an intake valve closing event when the driver input is the constant or the decreasing torque request;
   retarding the intake valve closing event when the driver input is the increasing torque request and a manifold absolute pressure is less than an ambient pressure reduced by a predetermined value; and
   advancing the intake valve closing event when the driver input is the increasing torque request and the manifold absolute pressure is greater than the ambient pressure reduced by the predetermined value.

\* \* \* \* \*